H. E. MATTOX.
HOLDER FOR TROLLEY POLES.
APPLICATION FILED MAR. 24, 1914.
1,166,617.  Patented Jan. 4, 1916.
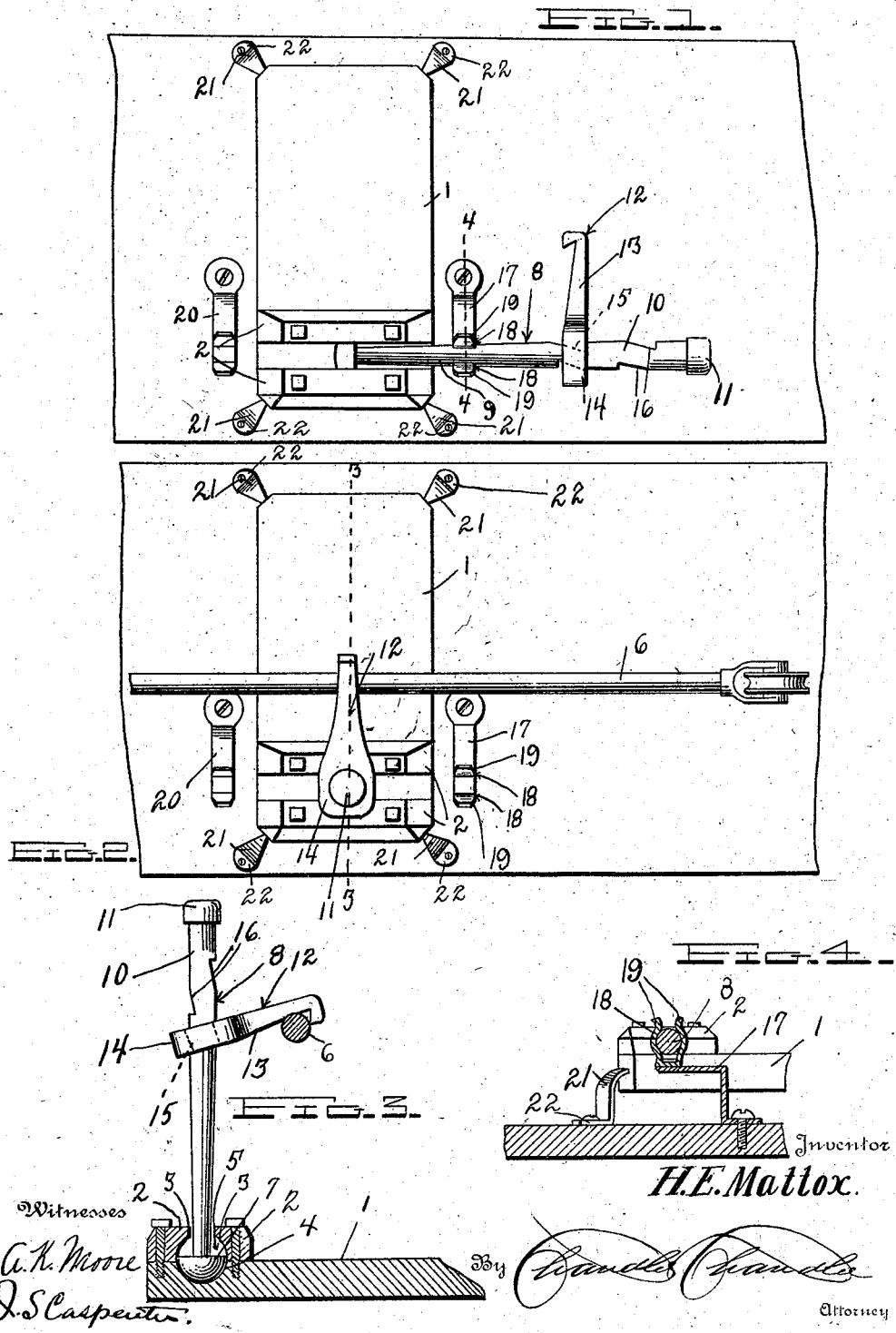

UNITED STATES PATENT OFFICE.

HARRY E. MATTOX, OF SHERMAN, CALIFORNIA.

HOLDER FOR TROLLEY-POLES.

1,166,617.  Specification of Letters Patent.  Patented Jan. 4, 1916.

Application filed March 24, 1914. Serial No. 826,940.

*To all whom it may concern:*

Be it known that I, HARRY E. MATTOX, a citizen of the United States, residing at Sherman, in the county of Los Angeles, State of California, have invented certain new and useful Improvements in Holders for Trolley-Poles; and I do hereby declare the following to be a full, clear, and exact description of the invention, such as will enable others skilled in the art to which it appertains to make and use the same.

The present invention is directed to improvements in holders for trolley poles, and has for its object to provide a holder of this type which will firmly hold the trolley pole in its lowered position.

A further object of the invention is to so construct a device of this character that the same can be easily and quickly applied to the top of a trolley car, and when in place thereon will hold the trolley pole in its lowered position so as to retain the trolley wheel from contact with the trolley wire.

With these and other objects in view, this invention resides in the novel features of construction, formation, combination and arrangement of parts to be hereinafter more fully described, claimed and illustrated in the accompanying drawing, in which:—

Figure 1 is a fragmentary plan view of a trolley car top with the holder in place thereon, and in its inoperative position. Fig. 2 is a similar view, showing the device in its operative position. Fig. 3 is a sectional view on line 3—3 of Fig. 2. Fig. 4 is a similar view on line 4—4 of Fig. 1.

Referring to the drawing, the numeral 1 designates a base having mounted thereon, and disposed in spaced relation ribs 2, said ribs having their confronting sides formed with recesses 3, which coöperate with the concaved recess 4 formed in the base to form a socket 5, the purpose of which will appear later. The base 1 is secured in any suitable manner to the top of the car, and in proper respect to the base of the usual trolley pole 6.

Swivelly mounted in the socket 5 is a head 7, said head being formed upon the lower end of the bar 8, said bar being circular in cross section for a portion of its length, as indicated by the numeral 9, and rectangular in cross section for the remaining portion of its length, as indicated at 10. Formed upon the bar opposite to the end having the head 7 is a head 11, which serves to prevent disengagement of the hook 12, said hook having its shank 13 terminating in an enlargement 14, which is provided with a rectangular bore 15 which slidably engages the squared portion of the bar 8.

The squared portion of the bar 8 is provided with diagonally disposed notches 16, which coöperate with the bore 15 so that when the hook 12 is tilted in respect to the bar 8 it will be prevented from sliding upon the bar, thus preventing the trolley pole 6 from moving upwardly when engaged by the hook 12.

Connected to the top of the car and adjacent the base 1 is a bracket 17, the free end of which is provided with resilient jaws 18, the same being curved and have their upper ends flared outwardly, as at 19, so that the circular portion of the bar may readily enter for clamping engagement by the jaws 18, thus holding the bar 8 in its lowermost position. It will be of course understood that a similar bracket 20 is mounted upon the opposite side of the base 1 so that the bar 8 may be held upon either side of the base, this being readily accomplished, owing to the fact that the bar is swivelly connected in the socket 5 so that the same may be swung from side to side.

The base 1 is preferably connected to the car top by brackets 21, which have their ends engaged in the corners of the base, while the flanges 22 thereof are secured to the car roof, said brackets being so constructed that the base 1 can be supported on a level with the trolley pole base.

What is claimed is:—

1. A holder for trolley poles comprising a base adapted to be secured to the roof of a car, a bar swivelly connected to the base, a hook slidably mounted on the bar, clamping jaws mounted upon the roof of the car to engage the bar when in its lowered position.

2. A holder for trolley poles comprising a base adapted for attachment to the roof of a car, a bracket supported by the roof and adjacent the base, resilient jaws carried by the bracket, a bar having one end swivelly connected to the base, said bar having diagonally disposed notches formed therein, a hook having an enlargement, said enlargement having a bore formed therein, certain walls of which engage the notches when the hook is tilted, thereby preventing the hook from sliding upon the bar.

In testimony whereof, I affix my signature, in the presence of two witnesses.

HARRY E. MATTOX.

Witnesses:
THOMAS FERON,
OSCAR N. BEASLEY.